(12) United States Patent
Binek et al.

(10) Patent No.: US 12,516,610 B2
(45) Date of Patent: Jan. 6, 2026

(54) OIL PASSAGE BUILT INTO BEARING COMPARTMENT SPRING

(71) Applicant: RTX Corporation, Farmington, CT (US)

(72) Inventors: Lawrence A. Binek, Glastonbury, CT (US); Christopher D. Ramsey, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 94 days.

(21) Appl. No.: 18/498,651

(22) Filed: Oct. 31, 2023

(65) Prior Publication Data

US 2024/0151267 A1    May 9, 2024

Related U.S. Application Data

(60) Provisional application No. 63/423,359, filed on Nov. 7, 2022.

(51) Int. Cl.
| | |
|---|---|
| *F01D 25/16* | (2006.01) |
| *B33Y 10/00* | (2015.01) |
| *B33Y 80/00* | (2015.01) |
| *F01D 25/18* | (2006.01) |

(52) U.S. Cl.
CPC ............ *F01D 25/164* (2013.01); *B33Y 10/00* (2014.12); *B33Y 80/00* (2014.12); *F01D 25/18* (2013.01); *F05D 2230/30* (2013.01)

(58) Field of Classification Search
CPC ...... F01D 25/16; F01D 25/162; F01D 25/164; F01D 25/18; F16C 27/00; F16C 27/02; F16C 27/04; F16C 27/045; F16C 27/06; F16C 27/063; F16C 27/066; F16C 27/08; B33Y 10/00; B33Y 80/00; F05D 2230/30; F05D 2230/31; F05D 2230/311; F05D 2230/312; F05D 2230/313; F05D 2230/314; F02C 7/06
See application file for complete search history.

(56) References Cited

U.S. PATENT DOCUMENTS

| | | | |
|---|---|---|---|
| 8,726,503 | B2 | 5/2014 | Pettinato et al. |
| 9,926,975 | B2 | 3/2018 | Smedresman et al. |
| 10,228,023 | B2 | 3/2019 | Clark et al. |
| 10,436,065 | B2 | 10/2019 | Dibenedetto |
| 10,794,222 | B1 | 10/2020 | Ganiger et al. |
| 11,230,946 | B2 | 1/2022 | Davis et al. |
| 11,519,296 | B1 | 12/2022 | Stiehler et al. |

(Continued)

FOREIGN PATENT DOCUMENTS

| | | |
|---|---|---|
| CN | 114483801 A | 5/2022 |
| EP | 2940324 B1 | 8/2017 |

OTHER PUBLICATIONS

Search Report Issued Mar. 19, 2024 in U421889EP, 7 pages.

*Primary Examiner* — Elton K Wong
(74) *Attorney, Agent, or Firm* — CANTOR COLBURN LLP

(57) ABSTRACT

According to an aspect, a bearing compartment includes a housing and a spring integrally formed with the housing. An oil passage is internally fabricated within the housing, and the oil passage extends into the spring. Further aspects can include a gas turbine engine with a bearing system and a method of manufacturing a bearing compartment.

20 Claims, 6 Drawing Sheets

(56) References Cited

U.S. PATENT DOCUMENTS

| | | | |
|---|---|---|---|
| 2015/0308502 A1* | 10/2015 | Hiller | F16C 33/4629 419/53 |
| 2021/0062679 A1 | 3/2021 | Marquie et al. | |
| 2021/0301875 A1* | 9/2021 | Lefebvre | F16C 19/54 |

\* cited by examiner

OIL PASSAGE BUILT INTO BEARING COMPARTMENT SPRING

CROSS-REFERENCE TO RELATED APPLICATIONS

This application claims the benefit of U.S. Provisional Application No. 63/423,359 filed Nov. 7, 2022, the disclosure of which is incorporated herein by reference in its entirety.

BACKGROUND

Exemplary embodiments of the present disclosure relate generally to gas turbine engines and, in one embodiment, to an oil passage built into a spring in a bearing compartment of a gas turbine engine.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotation of a propeller/fan or to produce electricity in a generator.

Certain parts, such as a bearing compartment, in a gas turbine engine need a supply of oil for cooling and/or lubrication. In conventional systems, oil is supplied via tubes that are separate from other components. In tight locations, there may be limited options where tubes can be added to reach oil nozzles. This can constrain oil nozzle placement and make assembly difficult where multiple tubes must be routed around other components.

BRIEF DESCRIPTION

Disclosed is a bearing compartment including a housing and a spring integrally formed with the housing. An oil passage is internally fabricated within the housing and the oil passage extends into the spring.

In addition to one or more of the features described above, or as an alternative to any of the foregoing embodiments, the spring can be a squirrel cage spring, and a centerline of struts of the spring can extend axially in parallel to an axis of rotation defined within a central cavity of the bearing compartment.

In addition to one or more of the features described above, or as an alternative to any of the foregoing embodiments, the spring can include an annular support member and a plurality of struts, and the oil passage can be fabricated within the annular support member and through two or more of the struts.

In addition to one or more of the features described above, or as an alternative to any of the foregoing embodiments, the oil passage within the annular support member can form a manifold to distribute oil to the two or more of the struts.

In addition to one or more of the features described above, or as an alternative to any of the foregoing embodiments, the annular support member can be an upper support, the spring can include a lower support, and the struts can extend between the upper support and the lower support.

In addition to one or more of the features described above, or as an alternative to any of the foregoing embodiments, the lower support can include a lower manifold in fluid communication with the manifold of the upper support through the two or more of the struts.

In addition to one or more of the features described above, or as an alternative to any of the foregoing embodiments, the bearing compartment can include an oil nozzle in fluid communication with the oil passage within the spring.

According to an aspect, a gas turbine engine can include a compressor section, a turbine section, a shaft coupled to the compressor section and the turbine section, and a bearing system. The bearing system is configured to support rotation of the shaft. The bearing system can include a housing integrally formed with a spring. An oil passage can be internally fabricated within the housing, and the oil passage can extend into the spring.

According to an aspect, a method of manufacturing a bearing compartment includes additively manufacturing a lower portion of a housing of the bearing compartment including a spring radially inward of the housing. The method also includes additively manufacturing a plurality of struts of the spring to extend axially within the housing. The method further includes additively manufacturing an upper portion of the housing extending from the lower portion. The upper portion includes an overhang region that is integrally formed with the spring. An oil passage is internally fabricated within the housing and the oil passage extends into the spring.

In addition to one or more of the features described above, or as an alternative to any of the foregoing embodiments, the spring can include an annular support member and the struts, and the method can include fabricating the oil passage within the annular support member and through two or more of the struts, and the oil passage within the annular support member can form a manifold to distribute oil to the two or more of the struts.

In addition to one or more of the features described above, or as an alternative to any of the foregoing embodiments, the method can include establishing fluid communication between an oil nozzle and the oil passage within the spring.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
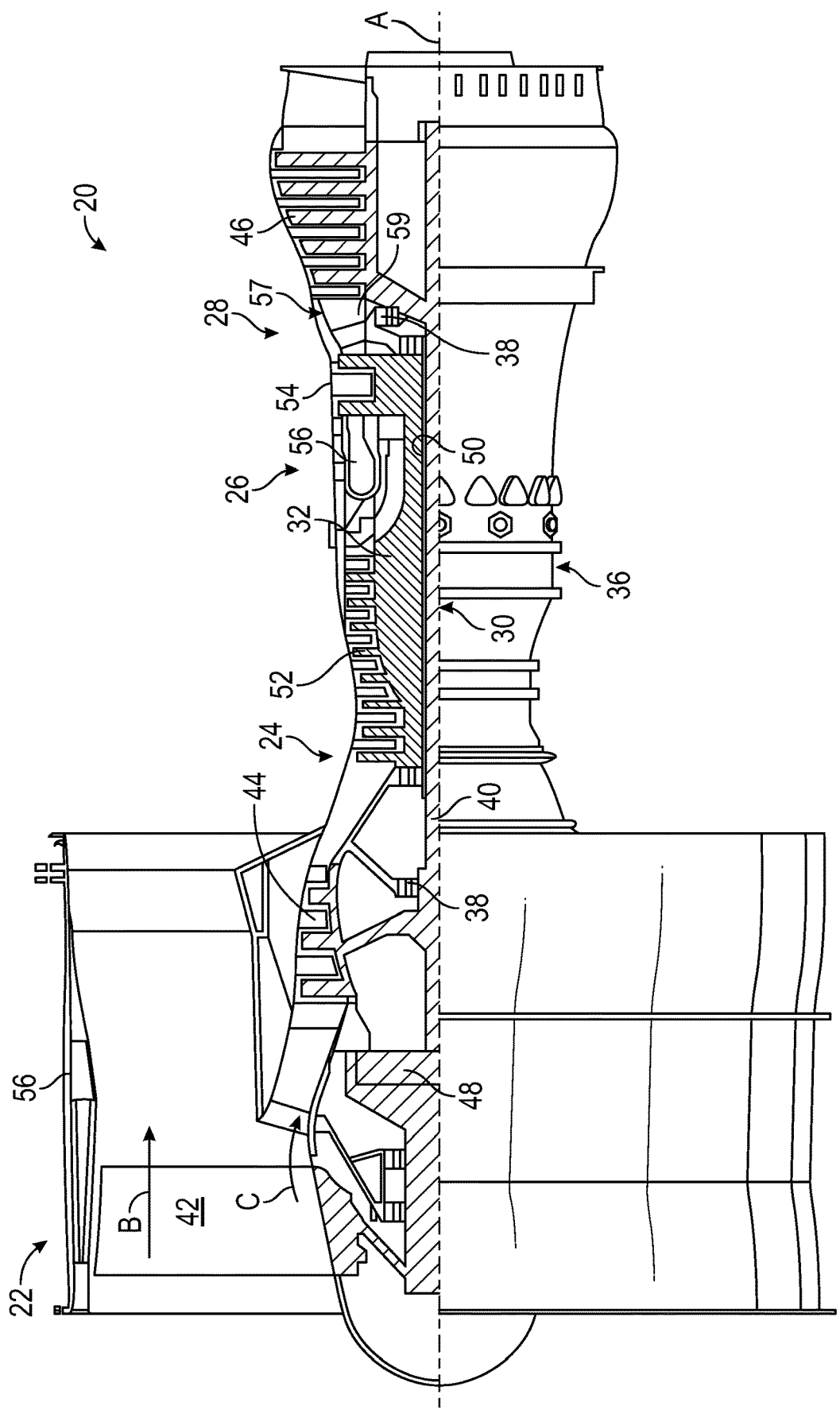
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

With continued reference to FIG. 1 and with additional reference to FIGS. 2-6, a bearing compartment 202 of the gas turbine engine 20 of FIG. 1 can be additively manufactured and include a number of features with a complex geometry. The bearing compartment 202 can be part of the bearing systems 38 to support rotation of one or more shafts, such as the inner shaft 40 or the outer shaft 50. The bearing compartment 202 includes a spring 220 integrally formed with a housing 230 of the bearing compartment 202. The housing 230 can include a lower portion 232 and an upper portion 234. Rather than separately manufacturing the lower portion 232 and upper portion 234, the housing 230 can be monolithically formed through an additive manufacturing process.

The upper portion 234 of the housing 230 can include an overhang region 236 that is supported by the spring 220 during an additive manufacturing build process. For example, the bearing compartment 202 can be manufactured using a powder bed fusion process, e.g., laser or electron beam based, to progressively build the housing 230 from the lower portion 232 to the upper portion 234 while also building the spring 220 within an interior of the housing 230. Forming the spring 220 integrally with the housing 230 can enhance structural stability and prevent the spring 220 from rotating relative to the housing 230 during assembly of the bearing compartment 202.

The spring 220 can include a plurality of struts 222 that extend axially within the housing 230. The spring 220 can be a squirrel cage spring, and a centerline D of the struts 222 can extend axially in parallel to an axis of rotation (e.g., engine central longitudinal axis A) defined within a central cavity 240 of the bearing compartment 202. The struts 222 can extend between a first annular support member 224 (e.g., a lower support) and a second annular support member 226 (e.g., an upper support).

In some embodiments, the spring 220 can include an oil passage 250 internally fabricated within one or more struts 222 of the spring 220. The oil passage 250 can provide a path for oil flow through the spring 220 to deliver oil at or below the lower support 224. The oil passage 250 can be fabricated within the upper support 226 and through two or more of the struts 222. The oil passage 250 within the upper support can form a manifold 252 to distribute oil to two or more of the struts 222. Oil can be delivered directly to an oil nozzle or be routed through one or more components of the bearing compartment 202 before reaching an oil nozzle after flowing through the oil passage 250. In some embodiments, all of the struts 222 can include the oil passage 250. Alternatively, a subset of the struts 222 can include the oil passage 250, such as every other strut 222, every third strut 222, every fourth strut 222, etc. The number of struts 222 that incorporate the oil passage 250 can be determined by an oil flow and pressure analysis. Incorporating the oil passage 250 in two or more of the struts 222 can provide a substantially symmetrical design of the spring 220 and multiple distribution paths.

Figure 2:
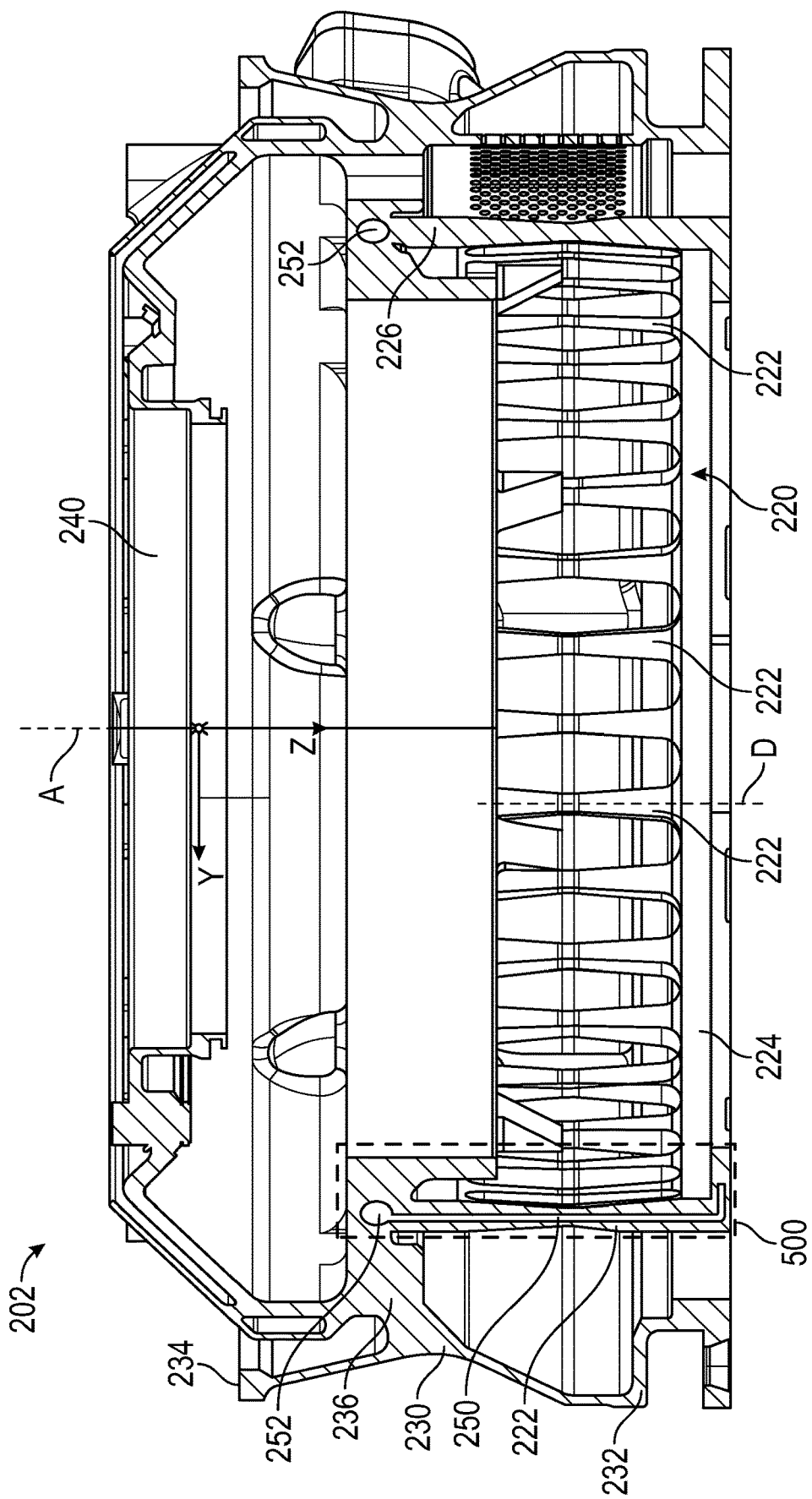
FIG. 2 is a side view of a bearing compartment with a spring in accordance with embodiments.
Figure 3:
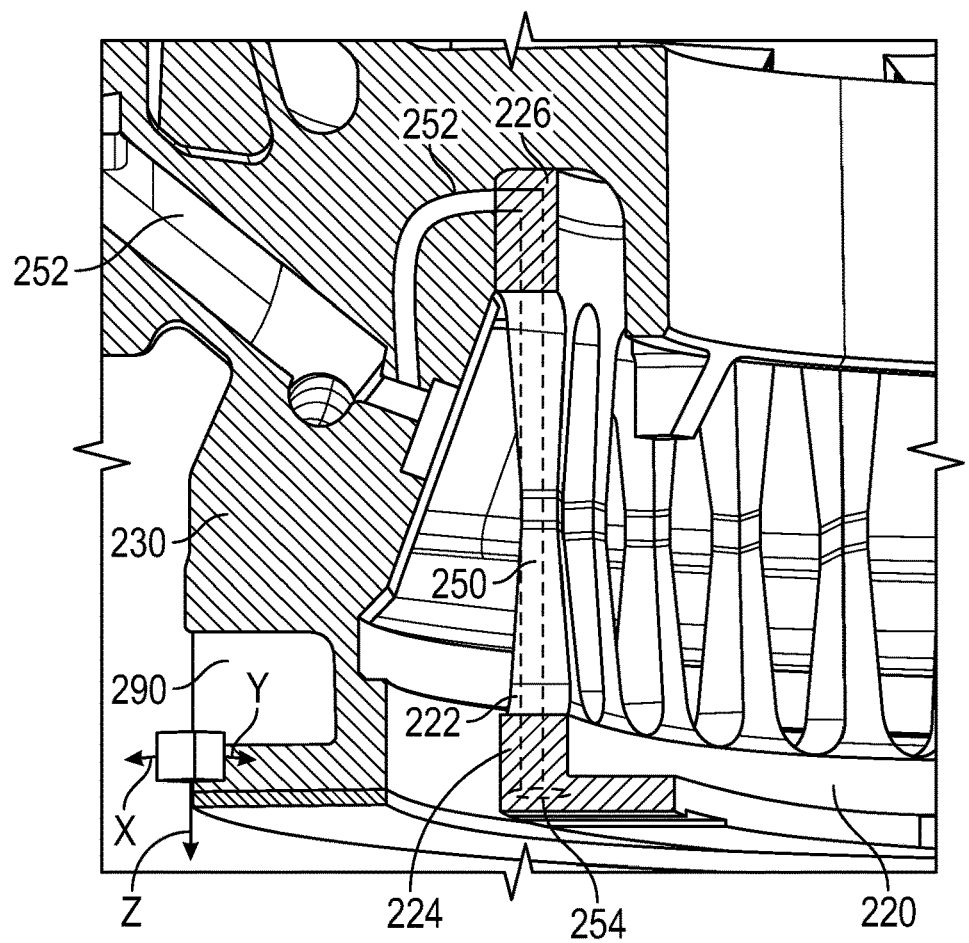
FIG. 3 depicts an example of an oil passage that can be formed in a spring strut in accordance with embodiments.

FIG. 3 depicts an example of an oil passage 250 that can be formed in housing 230 and a strut 222 of spring 220. The oil passage 250 can be internally fabricated within the housing 230, and the oil passage 250 extends into the spring 220, for instance, through upper support 226. In some embodiments, the oil passage 250 can be a direct flow-through passage that enters at the upper support 226, flows through the strut 222, and exits through a port 254 of the lower support 224. Thus, the manifold 252 of FIG. 2 may be omitted. There can be multiple separate instances of the oil passage 250 formed between the housing 230 can separate struts 222, where the oil passages 250 may not be in fluid communication with each other. The path of the oil passage 250 within the housing 230 can be determined based on structural analysis and flow dynamics of the oil.

Routing the oil passage 250 through the spring 220 can allow a flow of oil to reach the port 254, where an oil nozzle may be located or a path may be defined to reach a location further away from the spring 220. This can prevent the need for separate tubes to be routed within the bearing compartment 202 and allow oil to reach locations that may not otherwise be accessible. For example, the housing 230 may be manufactured with a support structure 290 that is later machined away and thus prevents the oil passage 250 from being routed down through the housing 230 to the port 254.

Figure 4:
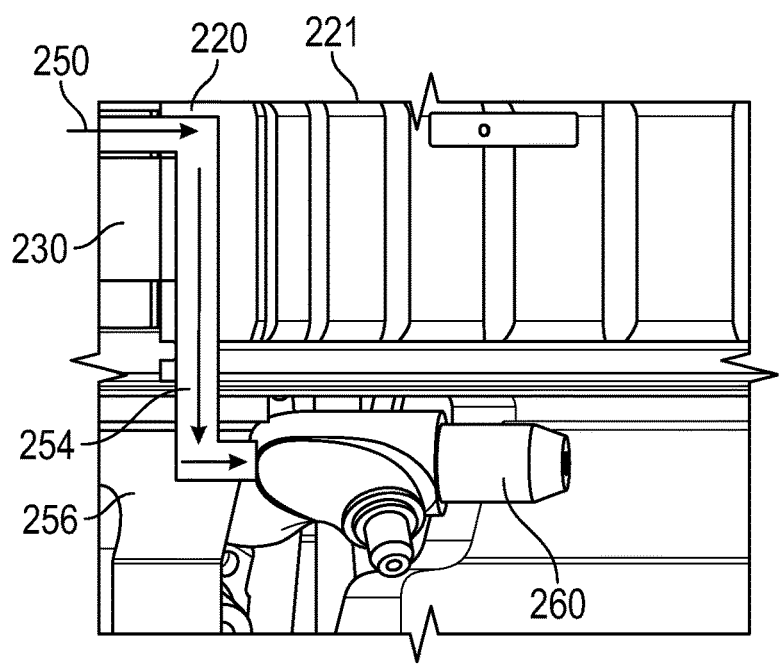
FIG. 4 depicts an example of an oil passage through a spring in accordance with embodiments.

FIG. 4 depicts an example of an oil passage 250 through a spring 220 in accordance with embodiments. The spring 220 may be shrouded by a cover 221. The oil passage 250 can pass through housing 230 and the spring 220. The oil passage 250 can exit the spring 220 at port 254 and continue within another component 256 of the bearing compartment 202 of FIG. 2 to one or more oil nozzles 260. Thus, oil can be distributed to locations below the spring 220 without the need for separate tubes within the bearing compartment 202.

Figure 5:
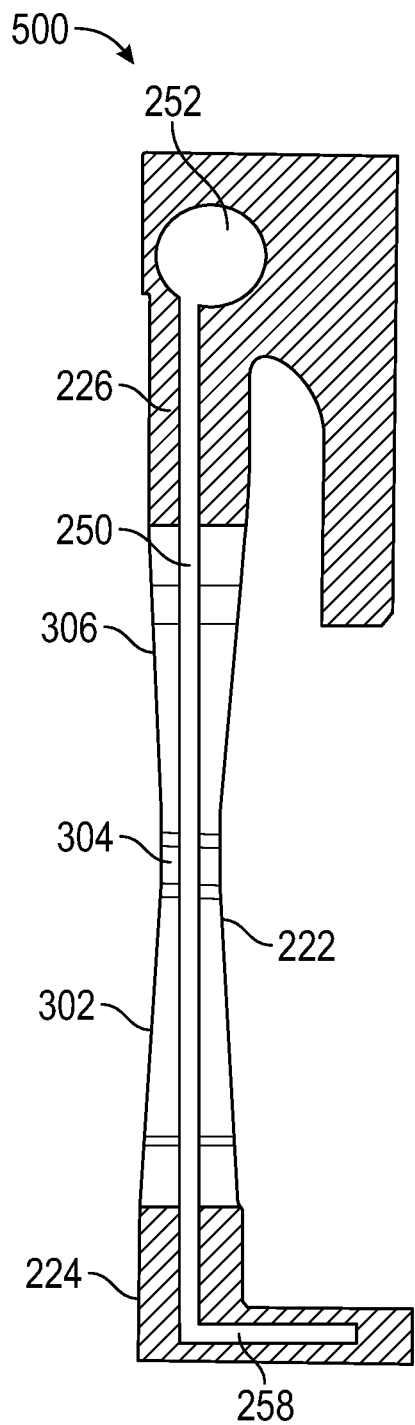
FIG. 5 is an enlarged view of the portion of FIG. 2 in accordance with embodiments.

FIG. 5 depicts additional aspects of a portion 500 of the spring 220 of FIG. 2 to better illustrate a strut 222 between the first annular support member 224 and the second annular support member 226. The body of the strut 222 can be canted such that the cross-sectional area of the strut 222 decreases when transitioning from the first annular support member 224 through a lower strut portion 302 to a central strut portion 304. The cross-sectional area of the strut 222 can increase when transitioning from the central strut portion 304 through an upper strut portion 306 to the second annular support member 226. This tapering or canting can be designed to provide a desired amount of damping such that the spring 220 is configured to deform in response to a force with a predetermined amount of deflection while also considering the effects of the oil passage 250 within the strut 222. The first annular support member 224 can also include a channel 258 that may extend laterally from the strut 222 to provide oil distribution to a location radially inward of the strut 222. The channel 258 may extend between multiple struts 222.

Figure 6:
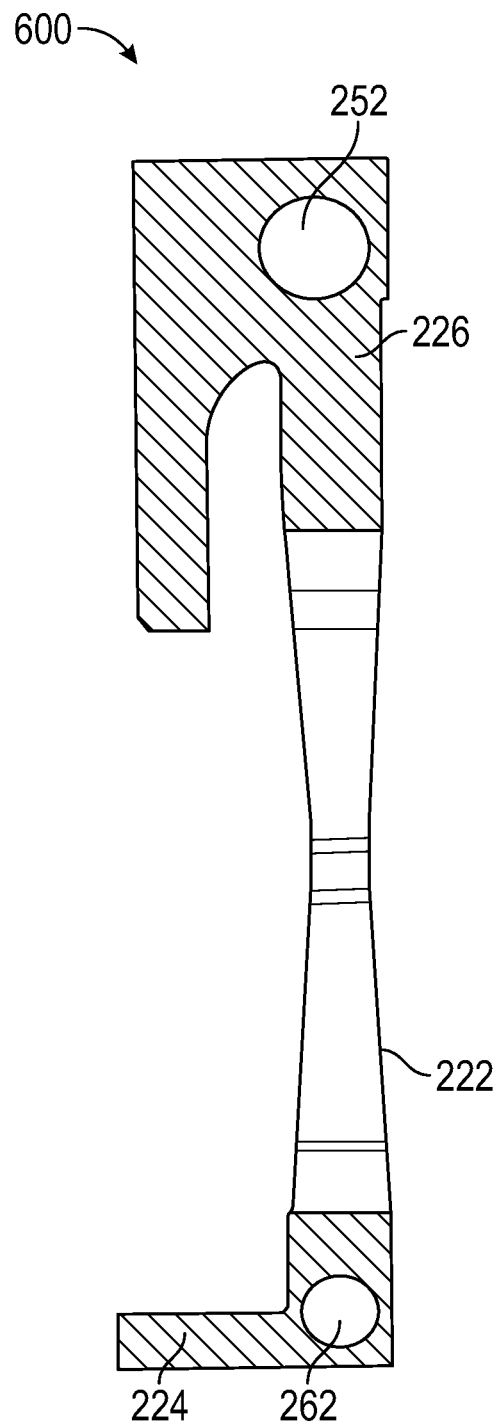
FIG. 6 depicts an alternate spring strut with upper and lower oil manifolds in accordance with embodiments.

FIG. 6 depicts an alternate spring strut with upper and lower oil manifolds in accordance with embodiments. In the example of FIG. 6, the strut 222 does not have the oil passage 250 formed within the strut 222. The strut 222 of FIG. 6 can be a support strut of the spring 220 that is formed between two of the struts 222 of FIG. 5 such that some struts 222 allow oil to flow through and others do not. The upper support 226 can include the manifold 252 and/or the lower support 224 can include a lower manifold 262 that allows oil circulation above and/or below the strut 222 of FIG. 6 within the spring 220 of FIG. 2.

Figure 7:
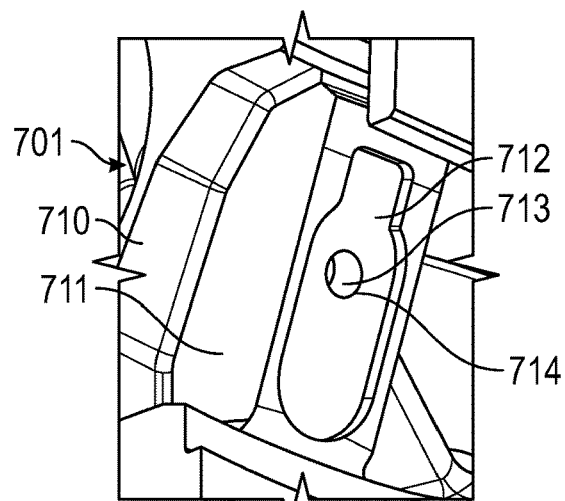
FIG. 7 is a perspective view of a bearing chamber and an interior surface of the bearing chamber with a terminal block in accordance with embodiments.
Figure 8:
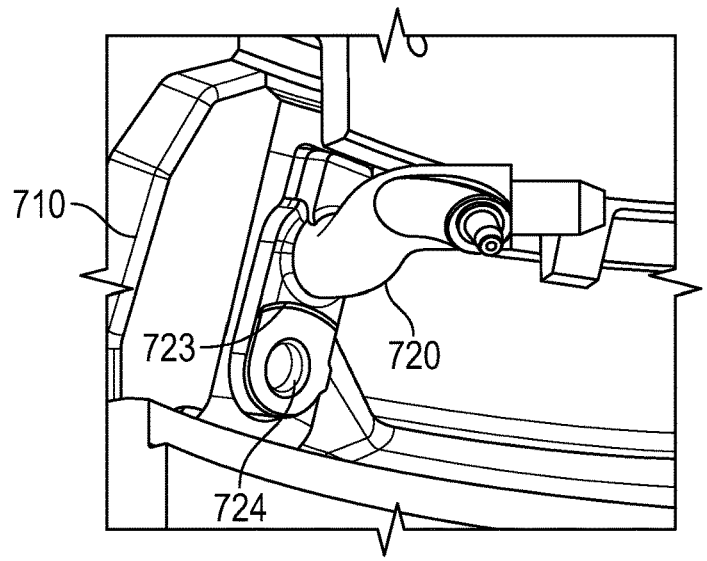
FIG. 8 is a perspective view of the bearing chamber and the interior surface of the bearing chamber with the terminal block of FIG. 7 and an oil nozzle in accordance with embodiments.
Figure 9:
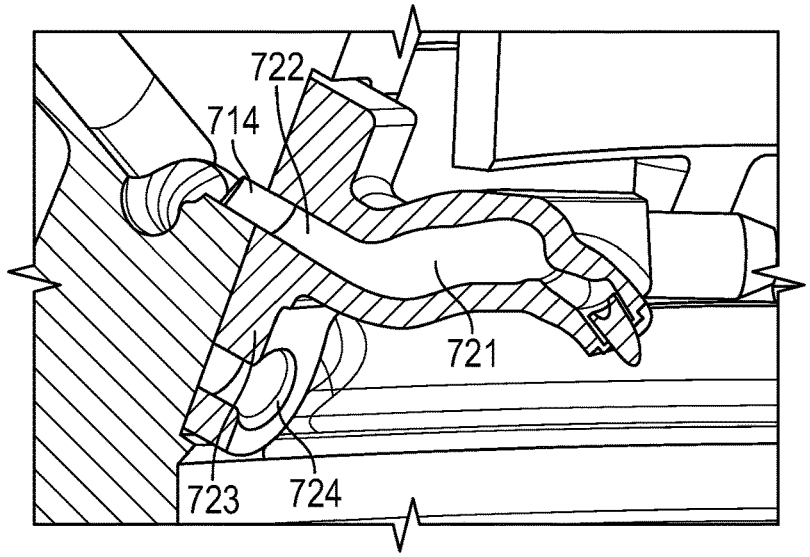
FIG. 9 is a perspective view of the bearing chamber and the interior surface of the bearing chamber with the terminal block of FIG. 7 and an interior of the oil nozzle of FIG. 8 in accordance with embodiments.

With reference to FIGS. 7-9, a bearing chamber 701 is provided and includes an interior surface 710, which can be additively manufactured, and an oil nozzle 720, which can also be additively manufactured. The bearing chamber 701 can be a portion of the bearing compartment 202 of FIG. 2. The interior surface 710 includes a terminal block 711 that is formed to define a keyway 712 and a conduit 713. The conduit 713 can extend through a body of the bearing chamber 701 and terminates at a terminus 714 at the keyway 712. The conduit 713 can be in fluid communication with the port 254. The oil nozzle 720 is an example of oil nozzle 260 of FIG. 4. The oil nozzle 720 can be formed to define an internal channel 721 with an opening 722 and includes a base 723. Both the keyway 712 and the base 723 can be elongate. In any case, the base 723 is tightly fittable in the keyway 712. The base 723 can also include a fastening point 724, at which the base 723 is fastened to the terminal block 711 at the keyway 712.

When the base 723 is tightly fit in the keyway 712 as shown in FIGS. 8 and 9, the opening 722 of the internal channel 721 sits flush against the terminus 714 of the conduit 713 whereby the internal channel 721 is fluidly communicative with the conduit 713. As such, oil or other fluids directed into and through the conduit 713 enter and flow through the internal channel 721. In addition, when the base 722 is tightly fit in the keyway 712, an orientation of the keyway 712 and a configuration of the oil nozzle 720 are cooperatively established to aim the oil nozzle 720 at one or more predefined targets within the bearing chamber 701. In this way, the orientation of the keyway 712 and the configuration of the oil nozzle 720 work cooperatively to aim a flow of oil or other fluids passing through the internal channel 721 toward the one or more predefined targets.

Figure 10:
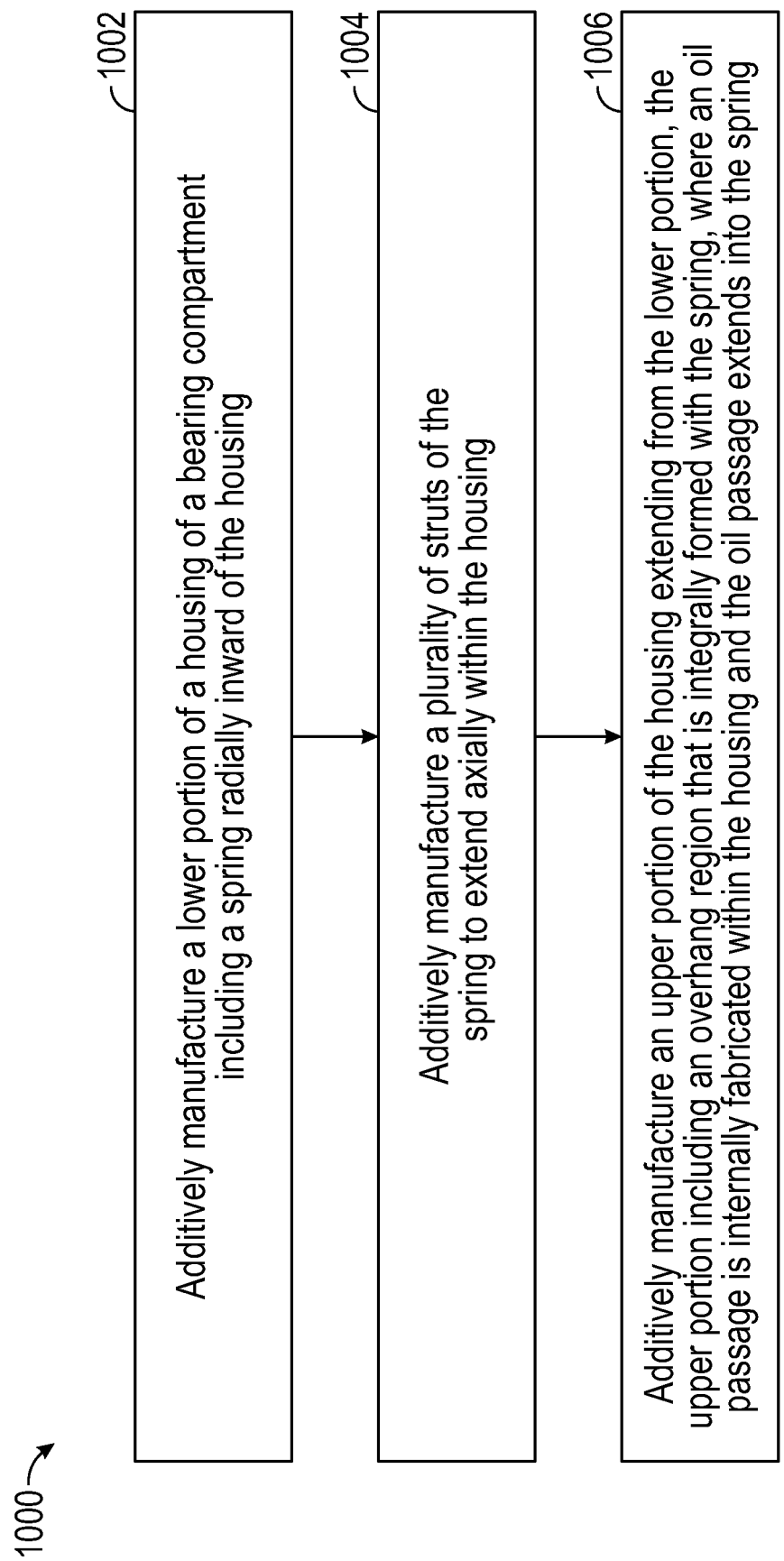
FIG. 10 is a flow diagram illustrating a method of manufacturing a bearing compartment in accordance with embodiments.

With reference to FIG. 10, a method 1000 of manufacturing a bearing compartment, such as the bearing compartment 202 described above, is provided. At block 1002, the method 1000 includes additively manufacturing a lower portion 232 of a housing 230 of the bearing compartment 202 including a spring 220 radially inward of the housing 230. At block 1004, the method 1000 includes additively manufacturing a plurality of struts 222 of the spring 220 to extend axially within the housing 230. At block 1006, the method 1000 includes additively manufacturing an upper portion 234 of the housing 230 extending from the lower portion 232, where the upper portion 234 includes an overhang region 236 that is integrally formed with the spring 220. An oil passage 250 can be internally fabricated within the housing 230, and the oil passage 250 extends into the spring 220.

In some embodiments, the spring 220 is additively manufactured as a squirrel cage spring, and a centerline D of the struts 222 extend axially in parallel to an axis of rotation defined within a central cavity 240 of the bearing compartment 202. In some embodiments, the spring 220 includes an annular support member, such as the first annular support member 224 and/or the second annular support member 226, and the struts 222. The method 1000 can also include fabricating the oil passage 250 within the annular support member and through two or more of the struts 222, and the oil passage 250 within the annular support member can form a manifold to distribute oil to two or more of the struts 222, such as manifold 252. The annular support member can be an upper support 226, the spring 220 can include a lower support 224, and the struts 222 can extend between the upper support 226 and the lower support 224. The lower support 224 can include a lower manifold 262 in fluid communication with the manifold 252 of the upper support 226 through two or more of the struts 222. The method 1000 can also include establishing fluid communication between an oil nozzle 260 and the oil passage 250 within the spring 220.

Benefits of the features described herein include a spring formed integrally with a bearing compartment through the use of additive manufacturing that allows for complex geometries with integrated oil passages. Oil nozzles can be located in close proximity to the spring. The use of external tubes in multiple locations near the spring can be reduced or eliminated by forming internal oil passages within the bearing compartment housing and within the structure of the spring. Oil passages can be distributed in multiple spring struts to reach desired oil flow rates to targeted locations. The passages may also provide opportunities for additional oil spray locations that are not otherwise possible when using separate nozzles and tubes. Using a squirrel cage spring design, the outer rims (e.g., annular support members) can serve as internal oil manifolds to distribute oil to passages within struts of the spring. The additional flow paths can support closer alignment of nozzles with bearing and seal targets than may otherwise be possible. Nozzles may be installed near the base of the spring where there is less flexing for more consistent lubrication at targeted locations.

The term "about" is intended to include the degree of error associated with measurement of the particular quantity based upon the equipment available at the time of filing the application. Terms such as "upper" and "lower" are used for purposes of explanation and the designation as such can be altered depending upon component orientation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing compartment comprising:
    a housing comprising:
    an upper portion; and
    a lower portion,
    wherein the lower portion includes a spring radially inward of an outer portion of the housing that extends between the upper portion and the lower portion, and the spring is integrally formed with the housing,
    wherein an oil passage is internally fabricated within the housing,
    wherein the upper portion extends from the lower portion and includes an overhang region that is integrally formed with the spring,
    wherein the spring includes a plurality of struts extending axially within the housing, and the oil passage extends into the spring.

2. The bearing compartment of claim 1, wherein the spring is a squirrel cage spring, and a centerline of the struts of the spring extends axially in parallel to an axis of rotation defined within a central cavity of the bearing compartment.

3. The bearing compartment of claim 1, wherein the spring comprises an annular support member, and the oil passage is fabricated within the annular support member and through two or more of the struts.

4. The bearing compartment of claim 3, wherein the oil passage within the annular support member forms a manifold to distribute oil to the two or more of the struts.

5. The bearing compartment of claim 4, wherein the annular support member is an upper support, the spring comprises a lower support, and the struts extend between the upper support and the lower support.

6. The bearing compartment of claim 5, wherein the lower support comprises a lower manifold in fluid communication with the manifold of the upper support through the two or more of the struts.

7. The bearing compartment of claim 1, further comprising an oil nozzle in fluid communication with the oil passage within the spring.

8. A gas turbine engine comprising:
    a compressor section;
    a turbine section;
    a shaft coupled to the compressor section and the turbine section; and a bearing system configured to support rotation of the shaft, the bearing system comprising a housing including an upper portion and a lower portion, wherein the lower portion includes a spring radially inward of an outer portion of the housing that extends between the upper portion and the lower portion, and the spring is integrally formed with the housing, wherein an oil passage is internally fabricated within the housing, wherein the upper portion extends from the lower portion and includes an overhang region that is integrally formed with the spring, wherein the spring includes a plurality of struts extending axially within the housing, and the oil passage extends into the spring.

9. The gas turbine engine of claim 8, wherein the spring is a squirrel cage spring, and a centerline of the struts of the spring extends axially in parallel to an axis of rotation of the shaft within a central cavity of the bearing compartment.

10. The gas turbine engine of claim 8, wherein the spring comprises an annular support member, and the oil passage is fabricated within the annular support member and through two or more of the struts.

11. The gas turbine engine of claim 10, wherein the oil passage within the annular support member forms a manifold to distribute oil to the two or more of the struts.

12. The gas turbine engine of claim 11, wherein the annular support member is an upper support, the spring comprises a lower support, and the struts extend between the upper support and the lower support.

13. The gas turbine engine of claim 12, wherein the lower support comprises a lower manifold in fluid communication with the manifold of the upper support through the two or more of the struts.

14. The gas turbine engine of claim 8, further comprising an oil nozzle in fluid communication with the oil passage within the spring.

15. A method of manufacturing a bearing compartment, the method comprising:

additively manufacturing a lower portion of a housing of the bearing compartment including a spring radially inward of an outer portion of the housing;

additively manufacturing a plurality of struts of the spring to extend axially within the housing; and additively manufacturing an upper portion of the housing extending from the lower portion, the outer portion of the housing extending between the upper portion and the lower portion, the upper portion including an overhang region that is integrally formed with the spring, wherein an oil passage is internally fabricated within the housing and the oil passage extends into the spring.

16. The method of claim 15, wherein the spring is additively manufactured as a squirrel cage spring, and a centerline of the struts extend axially in parallel to an axis of rotation defined within a central cavity of the bearing compartment.

17. The method of claim 15, wherein the spring comprises an annular support member and the struts, and further comprising:

fabricating the oil passage within the annular support member and through two or more of the struts, and the oil passage within the annular support member forms a manifold to distribute oil to the two or more of the struts.

18. The method of claim 17, wherein the annular support member is an upper support, the spring comprises a lower support, and the struts extend between the upper support and the lower support.

19. The method of claim 18, wherein the lower support comprises a lower manifold in fluid communication with the manifold of the upper support through the two or more of the struts.

20. The method of claim 15, further comprising:

establishing fluid communication between an oil nozzle and the oil passage within the spring.

* * * * *